(12) United States Patent
Mahajan et al.

(10) Patent No.: US 11,087,065 B2
(45) Date of Patent: Aug. 10, 2021

(54) METHOD OF MANUFACTURING DEVICES

(71) Applicant: ASML NETHERLANDS B.V., Veldhoven (NL)

(72) Inventors: Sunit Sondhi Mahajan, Veldhoven (NL); Abraham Slachter, Waalre (NL); Brennan Peterson, Longmont, CO (US); Koen Wilhelmus Cornelis Adrianus Van Der Straten, Oud Gastel (NL); Antonio Corradi, Eindhoven (NL); Pieter Joseph Marie Wöltgens, Veldhoven (NL)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 16/541,420

(22) Filed: Aug. 15, 2019

(65) Prior Publication Data

US 2020/0097633 A1 Mar. 26, 2020

(30) Foreign Application Priority Data

Sep. 26, 2018 (EP) .................................. 18196917
Feb. 11, 2019 (EP) .................................. 19156344

(51) Int. Cl.
*G06F 30/30* (2020.01)
*G06F 30/398* (2020.01)
(Continued)

(52) U.S. Cl.
CPC ........ *G06F 30/398* (2020.01); *G03F 7/70491* (2013.01); *G03F 7/7055* (2013.01);
(Continued)

(58) Field of Classification Search
None
See application file for complete search history.

(56) References Cited

U.S. PATENT DOCUMENTS 6,773,931 B2 * 8/2004 Pasadyn ................. H01L 22/20
438/10
6,952,253 B2 10/2005 Lof et al.
(Continued)

FOREIGN PATENT DOCUMENTS

EP 1628164 2/2006
WO 2011012624 2/2011

OTHER PUBLICATIONS

EPO Opinion, 3 pages. (Year: 0).*
(Continued)

*Primary Examiner* — Leigh M Garbowski
(74) *Attorney, Agent, or Firm* — Pillsbury Winthrop Shaw Pittman LLP

(57) ABSTRACT

A method for controlling a processing apparatus used in a semiconductor manufacturing process to form a structure on a substrate, the method including: obtaining a relationship between a geometric parameter of the structure and a performance characteristic of a device including the structure; and determining a process setting for the processing apparatus associated with a location on the substrate, wherein the process setting is at least partially based on an expected value of the geometric parameter of the structure when using the processing setting, a desired performance characteristic of the device and an expected physical yield margin or defect yield margin associated with the location on the substrate.

21 Claims, 10 Drawing Sheets

(51) Int. Cl.
  *G03F 7/20* (2006.01)
  *G06F 30/394* (2020.01)
  *G06F 119/08* (2020.01)
  *G06F 119/10* (2020.01)
  *G06F 119/12* (2020.01)
  *G06F 119/22* (2020.01)
  *G06F 119/18* (2020.01)

(52) U.S. Cl.
  CPC .......... *G03F 7/70483* (2013.01); *G06F 30/30* (2020.01); *G06F 30/394* (2020.01); *G06F 2119/08* (2020.01); *G06F 2119/10* (2020.01); *G06F 2119/12* (2020.01); *G06F 2119/18* (2020.01); *G06F 2119/22* (2020.01)

(56) References Cited

U.S. PATENT DOCUMENTS

| | | | | |
|---|---|---|---|---|
| 7,197,728 | B2* | 3/2007 | Yonezawa | G06F 30/367 |
| | | | | 716/56 |
| 7,448,012 | B1* | 11/2008 | Qian | G03F 1/70 |
| | | | | 716/122 |
| 7,512,508 | B2* | 3/2009 | Rajski | G01R 31/01 |
| | | | | 438/14 |
| 7,937,179 | B2* | 5/2011 | Shimshi | G06F 30/3323 |
| | | | | 700/110 |
| 8,621,401 | B2* | 12/2013 | Berkens | G03F 7/70525 |
| | | | | 716/54 |
| 8,713,511 | B1* | 4/2014 | Clark | G06F 30/30 |
| | | | | 716/136 |
| 9,798,853 | B2* | 10/2017 | Qian | G06F 30/394 |
| 10,372,043 | B2* | 8/2019 | Chen | G03F 7/705 |
| 10,627,723 | B2* | 4/2020 | Middlebrooks | G06N 7/005 |
| 2005/0240895 | A1 | 10/2005 | Smith et al. | |
| 2007/0254482 | A1* | 11/2007 | Kawabata | H01L 22/20 |
| | | | | 438/688 |
| 2007/0296960 | A1 | 12/2007 | Den Boef et al. | |
| 2008/0198380 | A1 | 8/2008 | Straaijer et al. | |
| 2009/0168062 | A1 | 7/2009 | Straaijer | |
| 2010/0007863 | A1 | 1/2010 | Jordanoska | |
| 2010/0328655 | A1 | 12/2010 | Den Boef | |
| 2011/0026032 | A1 | 2/2011 | Den Boef et al. | |
| 2011/0032500 | A1 | 2/2011 | Straaijer | |
| 2011/0102753 | A1 | 5/2011 | Van De Kerkhof et al. | |
| 2011/0102793 | A1 | 5/2011 | Straaijer | |
| 2011/0188020 | A1 | 8/2011 | Den Boef | |
| 2011/0249244 | A1 | 10/2011 | Leewis et al. | |
| 2012/0042290 | A1 | 2/2012 | Berkens et al. | |
| 2012/0044470 | A1 | 2/2012 | Smilde et al. | |
| 2012/0044495 | A1 | 2/2012 | Straaijer | |
| 2012/0259574 | A1* | 10/2012 | Hu | H01L 22/20 |
| | | | | 702/117 |
| 2013/0162996 | A1 | 6/2013 | Straaijer et al. | |
| 2013/0308142 | A1 | 11/2013 | Straaijer | |
| 2014/0303912 | A1* | 10/2014 | Banerjee | H01L 22/20 |
| | | | | 702/57 |
| 2016/0161863 | A1 | 6/2016 | Den Boef et al. | |
| 2016/0282282 | A1 | 9/2016 | Quintanilha et al. | |
| 2016/0284579 | A1* | 9/2016 | Kaizerman | H01L 22/12 |
| 2016/0313651 | A1 | 10/2016 | Middlebrooks et al. | |
| 2016/0370717 | A1 | 12/2016 | Den Boef et al. | |
| 2017/0184981 | A1 | 6/2017 | Quintanilha et al. | |
| 2018/0259858 | A1 | 9/2018 | Chen et al. | |

OTHER PUBLICATIONS

EPO Search Report, 1 page. (Year: 2019).*
O.D. Crisalle et al., "Adaptive Control of Photolithography," Proc. of SPIE vol. 1464, Integrated Circuit Metrology, Inspection, and Process Control V (1991), pp. 508-526. (Year: 1991).*
L.C. Mantalas et al., "Semiconductor process control," Proc. of SPIE vol. 10274, Critical Dimension Metrology and Process Control, Critical Reviews vol. CR52 (1994), pp. 230-266. (Year: 1994).*
Rodder, M., et al.: "Transistor Design With TCAD Tuning and Device Optimization for Process/Device Synthesis", TI/VLSITSA, 1993.

* cited by examiner

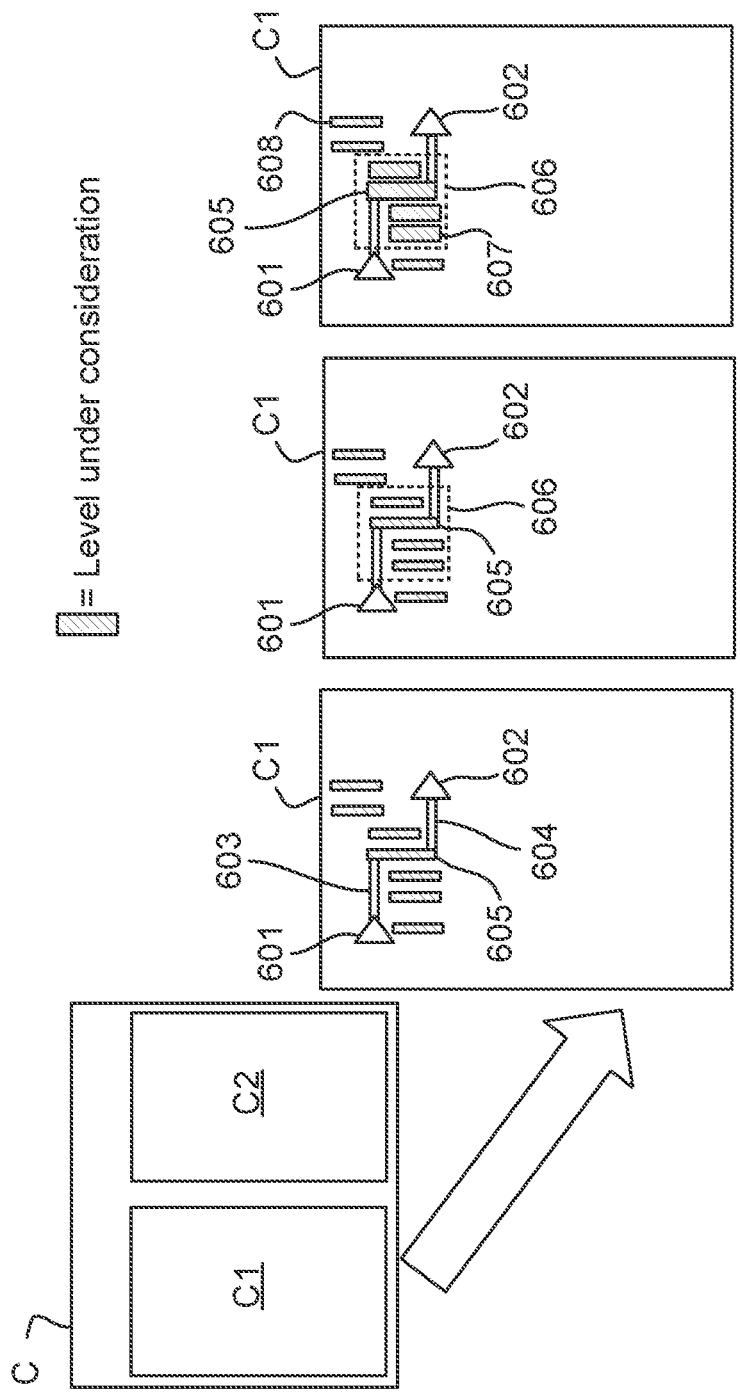

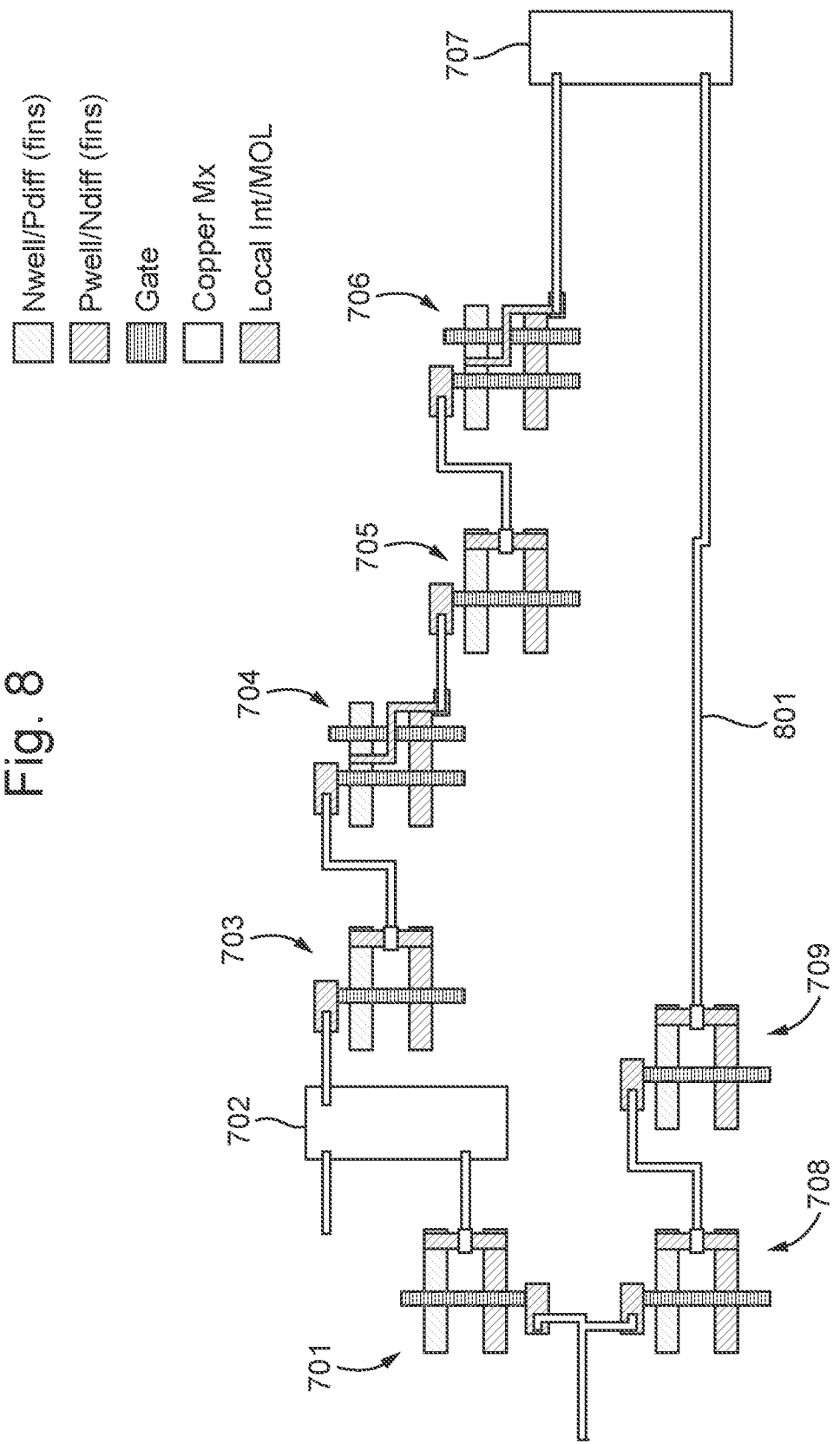

METHOD OF MANUFACTURING DEVICES

This application claims the benefit of priority of European Patent Application No. 18196917.1, which was filed on Sep. 26, 2018. The content of the foregoing application is incorporated herein in its entirety by reference.

Field

The present description relates to methods of manufacturing devices, especially using lithographic processes.

Background

There is a continuing desire to manufacture devices, e.g. integrated circuits, with ever smaller features. Integrated circuits and other microscale devices are often manufactured using optical lithography, but other manufacturing techniques, such as imprint lithography, e-beam lithography and nano-scale self-assembly are known.

When printing a pattern using lithography, various parameters of the exposure, for example focus and dose, can be varied to affect characteristics of the printed pattern, such as critical dimension (CD) and/or critical dimension uniformity (CDU). Conventionally an exposure recipe, which specifies values of the controllable parameters to be used during exposure of a specific pattern, is optimized to maximize yield. Yield is usually defined as the proportion of correctly printed devices. In some cases, an exposure recipe might be optimized to maximize throughput, that is the rate at which substrates are exposed. Often an exposure recipe is optimized to maximize process window, that is the tolerance by which one or more control parameters can vary from its nominal value while still obtaining a valid exposure.

SUMMARY

Increasingly, in modern semiconductor devices yield is not simply a matter of whether a device, or element of a device, is printed as intended or works. Issues of quality, defined by multi-valued or continuous parameters, may also be relevant. For example, path timing slack may determine if a circuit can achieve a desired speed of operation or leakage current may determine how long a memory cell can hold a value. Small variations in the size and/or placement of parts of an element can affect the resistance and/or capacitance of the element and so have an effect on these quality parameters.

An improved method of optimizing a device manufacturing method is desirable.

According to an aspect, there is provided a method for controlling a processing apparatus used in a semiconductor manufacturing process to form a structure on a substrate, the method comprising: obtaining a relationship between a geometric parameter of the structure and a performance characteristic of a device including the structure; and determining a process setting for the processing apparatus associated with a location on the substrate, wherein the process setting is at least partially based on an expected value of the geometric parameter of the structure when using the processing setting, a desired performance characteristic of the device and an expected physical yield margin or defect yield margin associated with the location on the substrate.

BRIEF DESCRIPTION OF THE DRAWINGS

Embodiments of the invention will now be described, by way of example only, with reference to the accompanying schematic drawings, in which:

FIG. 6 is a diagram illustrating a worked example of the method of an embodiment of the invention;

FIG. 8 is an exemplary chip layout of the circuit of FIG. 7A;

EXEMPLARY EMBODIMENTS

Figure 1:
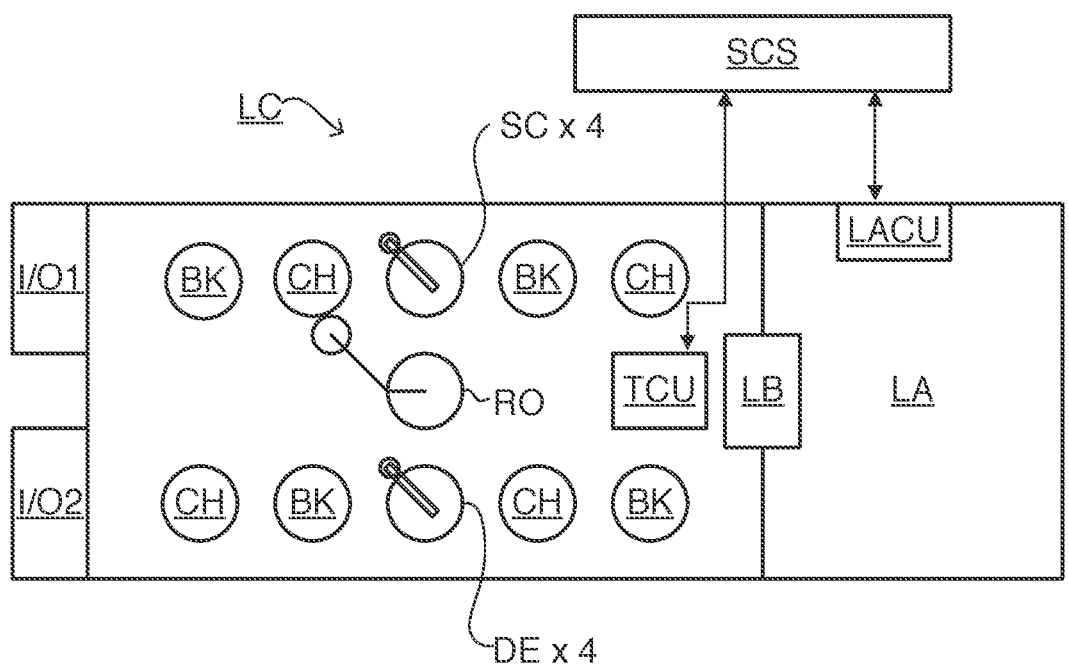
FIG. 1 depicts a lithocell.
Figure 2:
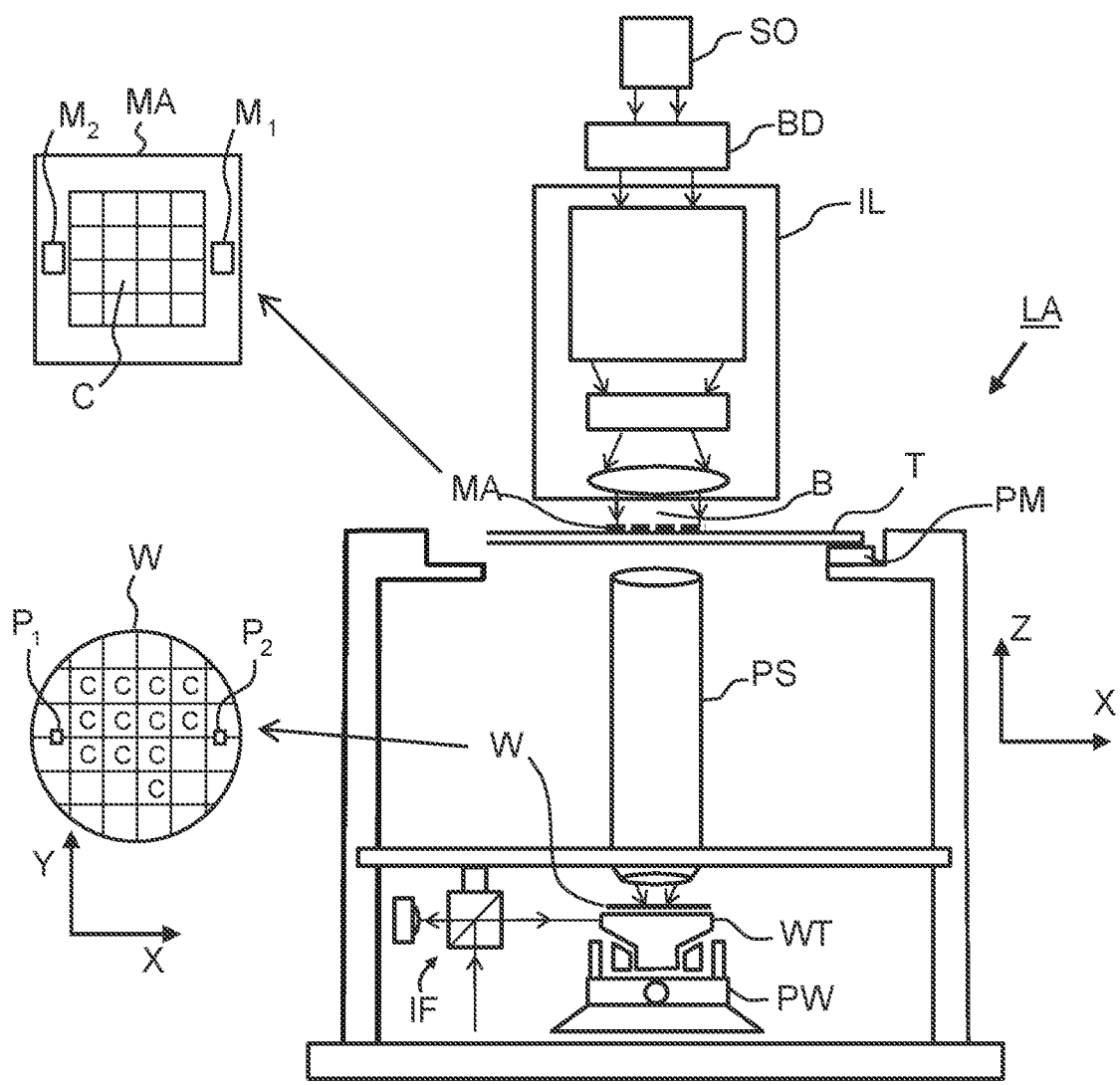
FIG. 2 depicts a lithographic apparatus.
Figure 3:
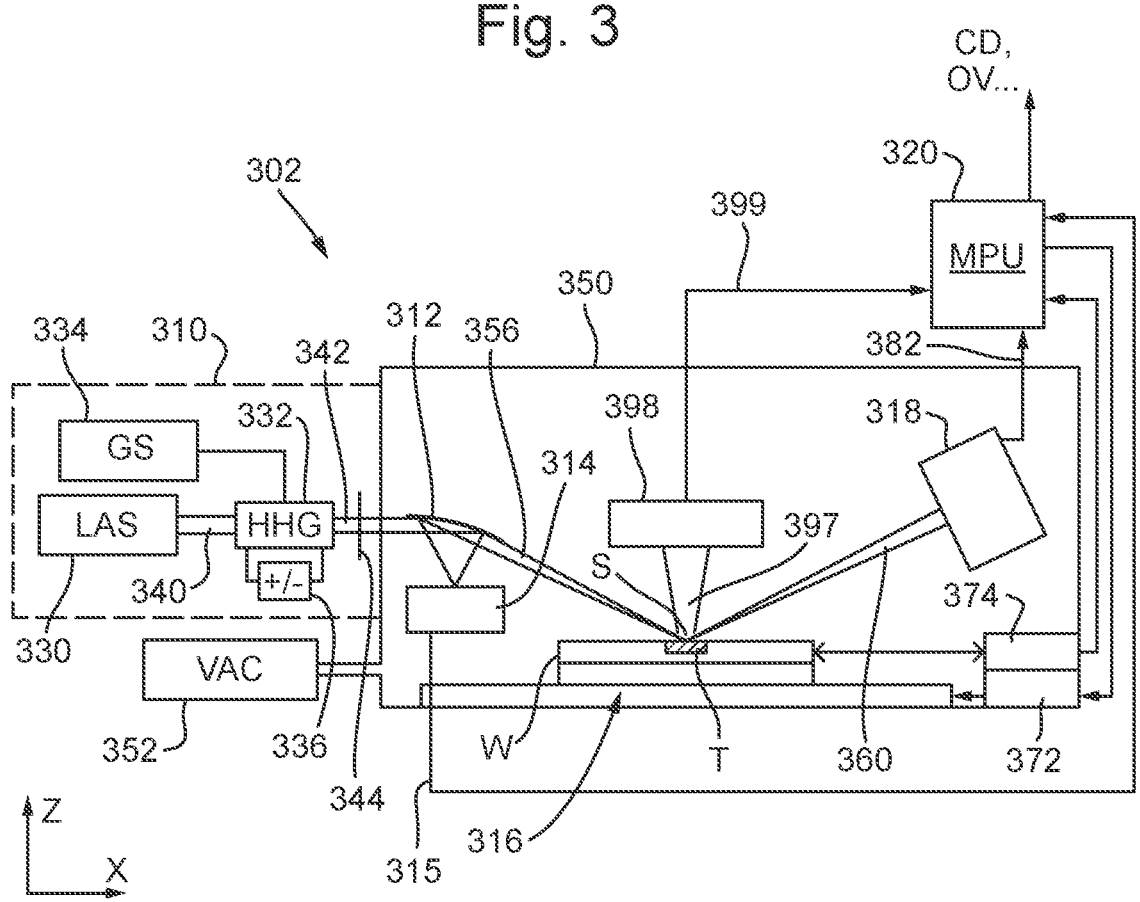
FIG. 3 depicts a schematic overview of a metrology apparatus.
Figure 4:
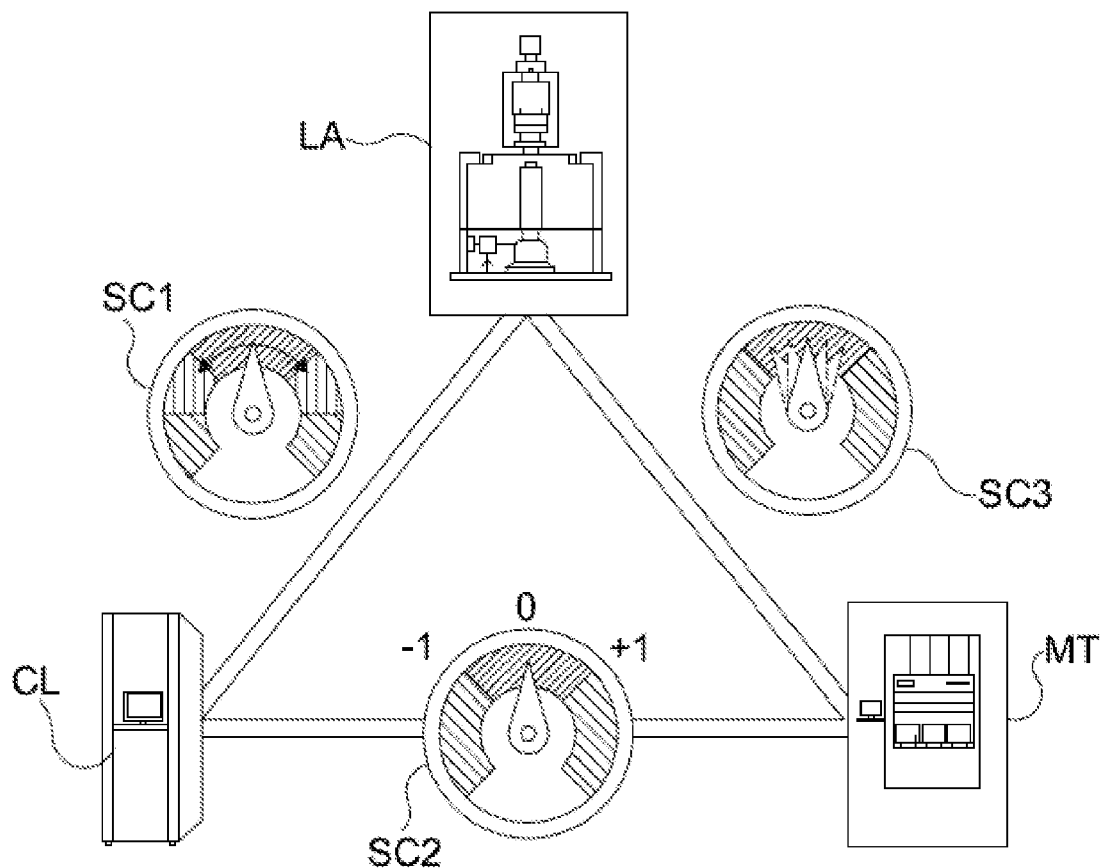
FIG. 4 depicts a method of holistic lithography.

A lithocell is schematically depicted in FIG. 1. A lithocell is an integrated system comprising a lithographic apparatus, e.g. as schematically depicted in FIG. 2, one or more substrate processing devices or apparatuses, and an inspection apparatus, e.g. as schematically depicted in FIG. 3. The lithocell can be configured to perform a control process which takes advantage of a tight control loop as depicted in FIG. 4. The lithographic apparatus, lithocell and process control are described below. The lithographic apparatus, lithocell and inspection apparatus can be used in a method of device manufacture according to an embodiment of the invention, which is described further below.

FIG. 2 schematically depicts a lithographic apparatus LA. The lithographic apparatus LA includes an illumination system (also referred to as illuminator) IL configured to condition a radiation beam B (e.g., UV radiation, DUV radiation or EUV radiation), a support (e.g., a mask table) MT constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein in its entirety by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the support MT, and is patterned by the pattern (design layout) present on patterning device MA. Having traversed the patterning device MA, the radiation beam B passes through the projection system PS, which focuses the beam onto a target portion C of the substrate W. With the aid of the second positioner PW and a position measurement system IF, the support WT can be moved accurately, e.g., so as to position different target portions C in the path of the radiation beam B at a focused and aligned position. Similarly, the first positioner PM and possibly another position sensor (which is not explicitly depicted in FIG. 2) may be used to accurately position the patterning device MA with respect to the path of the radiation beam B. Patterning device MA and substrate W may be aligned using patterning device alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

As shown in FIG. 1 the lithographic apparatus LA may form part of a lithographic cell LC, also sometimes referred to as a lithocell or (litho)cluster, which often also includes apparatus to perform pre- and post-exposure processes on a substrate W. Conventionally these include one or more spin coaters SC to deposit resist layers, one or more developers DE to develop exposed resist, one or more chill plates CH and/or one or more bake plates BK, e.g. for conditioning the temperature of substrates W e.g. for conditioning solvents in the resist layers. A substrate handler, or robot, RO picks up substrates W from input/output ports 1/01, 1/02, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure one or more properties of patterned structures, such as overlay error between subsequent layers, line thickness, critical dimension (CD), etc. For this purpose, one or more inspection tools (not shown) may be included in the lithocell LC. If an error is detected, an adjustment, for example, may be made to exposure of one or more subsequent substrates or made to one or more other processing steps that are to be performed on the substrates W, especially if the inspection is done before other substrates W of the same batch or lot are still to be exposed or processed.

An inspection apparatus, which may also be referred to as a metrology apparatus, is used to determine one or more properties of the substrates W, and in particular, how one or more values of one properties of different substrates W vary or how values of one or more properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the one or more properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Inspection tools are often also referred to as metrology tools MT. Different types of metrology tools MT for making such measurements are known, including scanning electron microscopes or various forms of scatterometer metrology tools MT. Scatterometers are versatile instruments which allow measurements of one or more parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in U.S. patent application publication nos. US 2010/0328655, US 2011/102753, US 2012/0044470, US 2011/0249244, and US 2011/0026032 and in European patent application publication no. EP 1,628,164, each of the foregoing patent application publications is incorporated herein in its entirety by reference. Aforementioned scatterometers may measure gratings using radiation from the soft x-ray and visible to near-IR wavelength range.

In an embodiment, the scatterometer MT is an angular resolved scatterometer. In such a scatterometer reconstruction methods may be applied to the measured signal to reconstruct or calculate one or more properties of the grating. Such reconstruction may, for example, result from simulating interaction of scattered radiation with a mathematical model of the target structure and comparing the simulation results with those of a measurement. One or more parameters of the mathematical model are adjusted until the simulated interaction produces a diffraction pattern similar to that observed from the real target.

In an embodiment, the scatterometer MT is a spectroscopic scatterometer MT. In such a spectroscopic scatterometer MT, the radiation emitted by a radiation source is directed onto the target and the reflected or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In an embodiment, the scatterometer MT is an ellipsometric scatterometer. The ellipsometric scatterometer allows for determining one or more parameters of a lithographic process by measuring scattered radiation for each of a plurality of polarization states. Such a metrology apparatus emits polarized radiation (such as linear, circular, or elliptic) by using, for example, appropriate polarization filters in the illumination section of the metrology apparatus. A source suitable for the metrology apparatus may provide polarized radiation as well. Various embodiments of existing ellipsometric scatterometers are described in U.S. patent application publication nos. 2007-0296960, 2008-0198380, 2009-0168062, 2010-0007863, 2011-0032500, 2011-0102793, 2011-0188020, 2012-0044495, 2013-0162996 and 2013-0308142, each of which is incorporated herein in its entirety by reference.

In an embodiment of scatterometer MT, the scatterometer MT is adapted to measure the overlay of two misaligned gratings or periodic structures by measuring asymmetry in the reflected spectrum and/or the detection configuration, the asymmetry being related to the extent of the overlay. The two (typically overlapping) grating structures may be applied in two different layers (not necessarily consecutive layers), and may be formed substantially at the same position on the substrate. The scatterometer may have a symmetrical detection configuration as described e.g. in European patent application publication no. EP 1,628,164, which is incorporated herein in its entirety by reference, such that any asymmetry is clearly distinguishable. This provides a straightforward way to measure misalignment in gratings. Further examples for measuring overlay error between the two layers containing periodic structures as target is measured through asymmetry of the periodic structures may be found in PCT patent application publication no. WO 2011/012624 and US patent application publication no. US 2016/0161863, each of which is incorporated herein in its entirety by reference.

One or more other parameters of interest may be focus and/or dose. Focus and dose may be determined simultaneously by scatterometry (or alternatively by scanning electron microscopy) as described in U.S. patent application publication no. US 2011/0249244, incorporated herein in its entirety by reference. A single structure may be used which has a unique combination of critical dimension and sidewall angle measurements for each point in a focus energy matrix (FEM—also referred to as focus exposure matrix). If these unique combinations of critical dimension and sidewall angle are available, the focus and dose values may be uniquely determined from these measurements.

A metrology target may be an ensemble of composite gratings, formed by a lithographic process, mostly in resist, but also after an etch process for example. Typically the pitch and line-width of the structures in the gratings strongly depend on the measurement optics (in particular the numerical aperture (NA) of the optics) to be able to capture diffraction orders coming from the metrology targets. As indicated earlier, the diffracted signal may be used to determine shifts between two layers (also referred to 'overlay') or may be used to reconstruct at least part of the original grating as produced by the lithographic process. This reconstruction may be used to provide guidance of the quality of the lithographic process and may be used to control at least part of the lithographic process. Targets may have smaller sub-segmentation which are configured to mimic dimensions of the functional part of the design layout in a target. Due to this sub-segmentation, the targets will behave more similar to the functional part of the design layout such that the overall process parameter measurements resemble the functional part of the design layout better. The targets may be measured in an underfilled mode or in an overfilled mode. In the underfilled mode, the measurement beam generates a spot that is smaller than the overall target. In the overfilled mode, the measurement beam generates a spot that is larger than the overall target. In such overfilled mode, it may also be possible to measure different targets simultaneously, thus determining different processing parameters at the same time.

Overall measurement quality of a lithographic parameter using a specific target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may be, for example, a sensitivity of one of the measurement parameters to processing variations. More examples are described in U.S. patent application publication nos. US 2016/0161863 and US 2016/0370717, each of which is incorporated herein in its entirety by reference.

Typically the patterning process in a lithographic apparatus LA is one of the most critical steps in the processing which requires high accuracy of dimensioning and placement of structures on the substrate W. To help ensure this high accuracy, three systems may be combined in a control environment as schematically depicted in FIG. 4. One of these systems is the lithographic apparatus LA which is (virtually) connected to a metrology tool MT (a second system) and to a computer system CL (a third system). An objective of such a control environment is to optimize the cooperation between these three systems to enhance the overall process window and provide tight control loops to help ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which one or more resolution enhancement techniques to use and to perform computational lithography simulations and calculations to determine which pattern layout of a patterning device and one or more lithographic apparatus settings achieve a largest overall process window of the patterning process (depicted in FIG. 4 by the double arrow in the first scale SC1). Typically, the one or more resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 4 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 4 by the multiple arrows in the third scale SC3).

FIG. 3 depicts a schematic representation of a metrology apparatus 302 in which radiation in the wavelength range from 0.1 nm to 100 nm may be used to measure one or more parameters of structures on a substrate. The metrology apparatus 302 presented in FIG. 3 is suitable for the soft X-rays (SXR) or EUV domain.

FIG. 3 illustrates a schematic physical arrangement of a metrology apparatus 302 comprising a spectroscopic scatterometer using EUV and/or SXR radiation, purely by way of example. An alternative form of inspection apparatus might be provided in the form of an angle-resolved scatterometer.

Inspection apparatus 302 comprises a radiation source 310, illumination system 312, substrate support 316, detection systems 318, 398 and metrology processing unit (MPU) 320.

Source 310 in this example comprises a generator of EUV or soft x-ray radiation based on, e.g., high harmonic generation (HHG) techniques. Alternatives to an HHG source are a discharge produced plasma (DPP) source, a free electron laser (FEL) source, an inverse Compton scattering (ICS) source or a compact synchrotron. HHG sources are available for example from KMLabs, Boulder Colo., USA (http://www.kmlabs.com). Main components of the radiation source are a drive laser LAS, 330 and an HHG gas cell HHG, 332. A gas supply GS, 334 supplies suitable gas to the gas cell, where it is optionally ionized by an electric source 336. The drive laser 300 may be, for example, a fiber-based laser with an optical amplifier, producing pulses of infrared radiation that may last for example less than 1 ns (1 nanosecond) per pulse, with a pulse repetition rate up to several megahertz, as required. The wavelength of the infrared radiation may be for example in the region of 1 μm (1 micron). The laser pulses are delivered as a first radiation beam 340 to the HHG gas cell 332, where in the gas a portion of the radiation is converted to higher frequencies than the first radiation to form a beam 342 including coherent second radiation of the desired wavelength or wavelengths.

The second radiation may contain multiple wavelengths. If the radiation is monochromatic, then measurement calculations (for example reconstruction of the structure of interest) may be simplified. The volume of gas within the gas cell 332 defines an HHG space, although the space need not be completely enclosed and a flow of gas may be used instead of a static volume. The gas may be for example a noble gas such as neon (Ne) or argon (Ar). $N_2$, $O_2$, He, Kr, Xe gases, or mixtures thereof, can also be used. These are matters of design choice, and may even be selectable options within the same apparatus. Different wavelengths will, for example, provide different levels of contrast when imaging structure of different materials. For inspection of metal structures or silicon structures, for example, different wavelengths may be selected to those used for imaging features of (carbon-based) resist, or for detecting contamination of such different materials. One or more filtering devices 344 may be provided. For example a filter such as a thin membrane of aluminum (Al) may serve to cut the fundamental infrared (IR) radiation from passing further into the inspection apparatus. A grating (not shown) may be provided to select one or more specific harmonic wavelengths from among those generated in the gas cell. Some or all of the beam path may be contained within a vacuum environment, bearing in mind that SXR radiation is absorbed when traveling in air. The various components of radiation source 310 and illumination optics 312 can be adjustable to implement different metrology 'recipes' within the same apparatus. For example different wavelengths and/or polarization can be made selectable.

Depending on the materials of the structure under inspection, different wavelengths may offer a desired level of penetration into lower layers. For resolving the smallest device features and defects among the smallest device features, then a short wavelength is likely to be preferred. For example, one or more wavelengths in the range 1-20 nm or optionally in the range 1-10 nm or optionally in the range 10-20 nm may be chosen. Wavelengths shorter than 5 nm suffer from very low critical angle when reflecting off materials typically of interest in semiconductor manufacture. Therefore choosing a wavelength greater than 5 nm will provide stronger signals at higher angles of incidence. On the other hand, if the inspection task is for detecting the presence of a certain material, for example to detect contamination, then wavelengths up to 50 nm could be useful.

From the radiation source 310, the filtered beam 342 enters an inspection chamber 350 where the substrate W including a structure of interest is held for inspection at a measurement position by substrate support 316. The structure of interest is labeled T. The gas pressure within inspection chamber 350 is maintained near vacuum by vacuum pump VAC, 352, so that EUV radiation can pass through the focusing system without undue attenuation. The illumination system 312 has the function of focusing the radiation into a focused beam 356, and may comprise for example a two-dimensionally curved mirror, or a series of one-dimensionally curved mirrors, as described in US patent application publication no. US 2017/0184981, which is incorporated herein in its entirety by reference. The focusing is performed to achieve a round or elliptical spot S less than approximately 10 μm in diameter, when projected onto the structure of interest. This can be achieved by directly imaging the source onto an image plane or by imaging a small aperture, which is irradiated by the source, onto an image plane. Substrate support 316 comprises for example an X-Y-Z translation stage and a rotation stage, by which any part of the substrate W can be brought to the focal point of beam to in a desired orientation. Thus the radiation spot S is formed on the structure of interest. Alternatively, or additionally, substrate support 316 comprises for example a tilting stage that may tilt the substrate W at a certain angle to control the angle of incidence of the focused beam on the structure of interest T.

Optionally, the illumination system 312 provides a reference beam of radiation to a reference detector 314 which may be configured to measure a spectrum and/or intensities of different wavelengths in the filtered beam 342. The reference detector 314 may be configured to generate a signal 315 that is provided to metrology processing unit 320 and the filter may comprise information about the spectrum of the filtered beam 342 and/or the intensities of the different wavelengths in the filtered beam.

Reflected radiation 360 is captured by detector 318 and a spectrum 382 is provided to processing unit 320 for use in calculating a property of the target structure T. The illumination system 312 and detection system 318 thus form an inspection apparatus. This inspection apparatus may comprise a soft X-ray and/or EUV spectroscopic reflectometer of the kind described in U.S. patent application publication no. US 2016/282282, which is incorporated herein in its entirety by reference.

If the target T has a certain periodicity, the radiation of the focused beam 356 may be partially diffracted as well. The diffracted radiation 397 follows another path at well-defined angles with respect to the angle of incidence than the reflected radiation 360. In FIG. 3, the drawn diffracted radiation 397 is drawn in a schematic manner and diffracted radiation 397 may follow many other paths than the drawn paths. The inspection apparatus 302 may also comprise a further detection system 398 that detects and/or images at least a portion of the diffracted radiation 397. In FIG. 3 a single further detection system 398 is drawn, but embodiments of the inspection apparatus 302 may comprise a plurality of further detection systems 398 that are arranged at different positions to detect and/or image diffracted radiation 397 at a plurality of diffraction directions. In other words, the (higher) diffraction orders of the focused radiation beam that impinges on the target T are detected and/or imaged by one or more further detection systems 398. The one or more detection systems 398 generate a signal 399 that is provided to the metrology processing unit 320. The signal 399 may include information of the diffracted radiation 397 and/or may include images obtained from the diffracted radiation 397.

To aid the alignment and focusing of the spot S with desired product structures, inspection apparatus 302 may also provide auxiliary optics using auxiliary radiation under control of metrology processing unit 320. Metrology processing unit 320 can also communicate with a position controller 372 which operates the translation stage, the rotation stage and/or the tilting stage. Processing unit 320 receives highly accurate feedback on the position and orientation of the substrate, via one or more sensors. One or more sensors 374 may include an interferometer, for example, which can measure the portion of the substrate support 316 with an accuracy in the region of picometers (pm). In the operation of the inspection apparatus 302, spectrum data 382 captured by detection system 318 is delivered to metrology processing unit 320.

The inspection apparatus uses soft X-ray and/or EUV radiation at any suitable incidence, e.g. normal incidence, near-normal incidence or grazing incidence, for example to perform diffraction-based measurements of asymmetry. The angle of incidence may also be in the range from 20 to 40 degrees, for example, 30 degrees. The inspection apparatus can be provided in a hybrid metrology system. One or more performance parameters to be measured can include overlay (OVL), critical dimension (CD), via contact landing (which is a combination of CD and OVL) and/or CD uniformity (CDU). One or more measurement techniques can include coherent diffraction imaging (CDI) and/or at-resolution overlay (ARO) metrology. The soft X-ray and/or EUV radiation may for example have wavelengths less than 100 nm, for example using radiation in the range 5-30 nm, of optionally in the range from 10 nm to 20 nm. The radiation may be narrowband or broadband in character. The radiation may have discrete peaks in a specific wavelength band or may have a more continuous character.

The inspection apparatus 302 can be used to measure structures within the resist material treated within the litho cell (after develop inspection or ADI), and/or to measure structures after they have been formed in harder material (after etch inspection or AEI). For example, substrates may be inspected using the inspection apparatus 302 after they have been processed by a developing apparatus, etching apparatus, annealing apparatus and/or other apparatus including thin layer deposition and ion implantation (doping) equipment.

In modern devices, parametric yield loss (for example loss due to failure of a device to meet a desired leakage rate or speed criterion) is increasingly important in determining total yield of a manufacturing process. In many logic circuits, parametric yield is primarily determined by front end (gate, typically) RC, and back end resistance. Often, a device is formed of a number of functional units, for example latches or memory cells. Each functional unit may be repeated many times in the device. Naturally, the design of such functional units is optimized as far as possible. However, the functional unit is usually designed in ignorance of the location within a field (or die) at which it will be used. Given that actual exposure conditions vary across a field and/or substrate, the design of a functional unit should allow for such variation of exposure conditions. Therefore, an embodiment of the present invention proposes to make use of possibilities to improve the parametric window in parallel with the physical yield window. In this way, an embodiment of the present invention can affect and improve device performance in both design and control by optimizing one or more geometric parameters, such as critical dimension and/or layer overlay, in lithographic fabrication steps. Where there is sufficient physical yield or defect yield margin, the process can be biased (e.g., larger contact or larger CD).

An embodiment of the invention controls a processing apparatus used in a semiconductor manufacturing process to form a structure (e.g. a functional unit) on a substrate by providing at least one process setting to be applied during part or all of a relevant process step. The process setting is arrived at by first obtaining a relationship between a geometric parameter of the structure and a performance characteristic of a device including the structure. Then the process setting is determined based on an expected value of the geometric parameter of the structure when using the processing setting and a desired performance characteristic of the device.

An embodiment of the invention is especially applicable where the processing apparatus is a lithographic apparatus and the process setting can be one or more selected from: focus, focus drilling, dose, dose profile, optical aberration of the projection system, pattern placement, pupil intensity distribution (pupil shape), and/or illumination source bandwidth.

Devices are generally made up of multiple structures, including different structures and multiple copies of the same structure. A structure may form a functional sub-unit of a device, e.g. a latch, gate or memory cell. In an embodiment of the invention a process setting is determined for a plurality of different structures included in the device. One or more structures of a device might be more critical to the performance of the device than one or more other structures. Determination of one or more process settings can be performed for a subset of the structures making up the device that is most critical to its performance.

Where a structure is used multiple times within a device, a local factor—such as whether it is adjacent to one or more different or similar structures—can influence the formation of a structure. However, at patterning device level the design of all examples of a given structure may be the same. In some cases locally varying assist features may be provided. Still, an optimum process setting for a given structure to improve the performance of the device may vary depending on the position of that structure within the device or the field. An embodiment of the present invention enables different process settings to be applied for different instances of the same structure.

Normally, a field or die (e.g. containing one or more devices) is formed multiple times on a single substrate. Variations in the features formed may occur between different fields. Often, edge fields (i.e. fields which overlap the edge of the substrate) behave differently than inner fields. In an embodiment of the invention, a process setting can be determined independently for a plurality of different devices to be formed at different locations on the substrate, as well as for different structures within the devices.

In many devices, a performance characteristic is influenced by the shape of a via or a line end because the shape of these parts affects the resistance and/or capacitance of a functional unit and hence its speed of operation and/or leakage. In an embodiment of the invention, a process setting is determined to make the shape of the via or line-end more conical.

For the purposes of the present description, a geometric parameter can be considered to be any parameter which determines the shape of all or part of a structure such that there is an influence on the performance of the device of which that structure is a part. Common geometric parameters include: dimension, sidewall angle, position, orientation, CD uniformity, line edge roughness, and/or edge placement error. A geometric parameter such as sidewall angle may affect all edges in a structure but not all edges will likely affect the performance of the device in the same way. When determining a relationship between a geometric parameter of a structure and the performance of the device including the structure, it might only be necessary to consider the effect of the geometric parameter on the part of the structure that has most influence on the performance of the device.

For the purposes of the present description, a performance characteristic is measurable, i.e. quantitative, characteristic relating to the performance of the device. The performance characteristic may relate to electrical and/or thermal performance of the device. Examples of performance characteristic include a speed or timing characteristic, such as the time taken for a signal to travel from one part of the device to another. Other examples of performance characteristic include a noise threshold, a leakage current, a decay rate and/or a required refresh rate. Thermal performance characteristics include measures of heat generation or transmission during operation and/or measures relating to sensitivity of the device to changes in operating temperature. Physical characteristics of a structure that affect performance characteristics of a device can include: electrical resistance of a part of the structure, capacitance of part of the structure, inductance of a part of the structure, and/or thermal conductivity of a part of the structure.

Having determined one or more process settings, an embodiment of the present invention also provides a device manufacturing method comprising: exposing a radiation-sensitive layer on a substrate to form a latent image therein; developing the radiation-sensitive layer to fix the latent image; and transferring the fixed image onto the substrate; wherein at least one of the exposing, developing and/or transferring steps is performed using the process setting(s).

Figure 5:
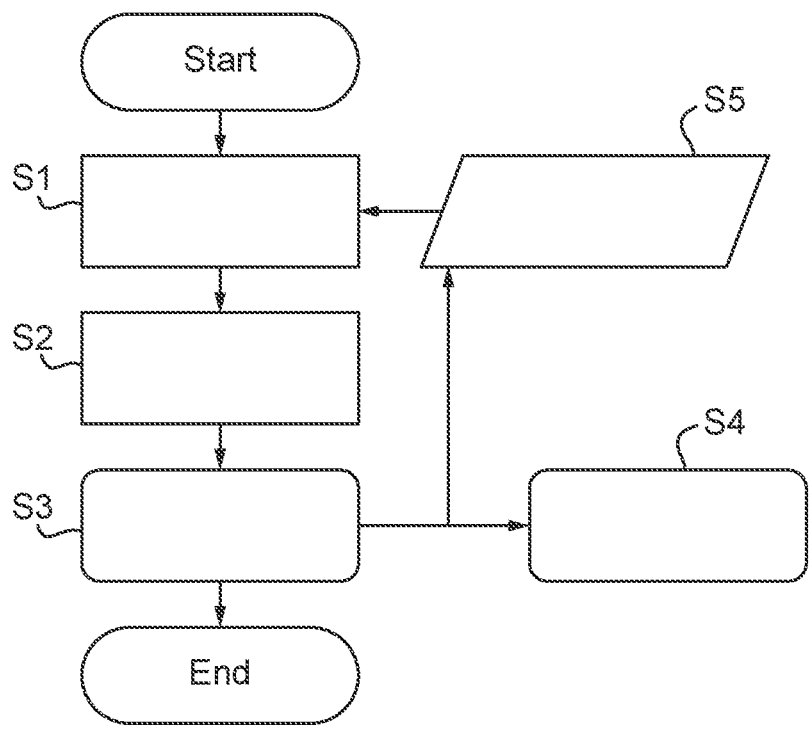
FIG. 5 is a flow chart of a method of an embodiment of the invention.

FIG. 5 is a flow chart depicting a method according to an embodiment of the invention. First, areas of a pattern to be printed that might benefit from local variation in one or more process settings are identified S1. This step can be performed based on knowledge of the type of features known to be sensitive to one or more locally adjustable process settings and/or based on knowledge of which one or more parts of the pattern are critical to achieving a desired performance characteristic. Empirical data S5 relating geometry of features to performance can also be employed.

Having identified one or more areas of potential benefit, one or more process settings are identified S2 to provide an improvement in the desired performance characteristic. Determination of the process setting to be applied can be done by simulation using known tools and known relationships between performance characteristics and feature geometry.

The one or more process settings are then applied in trial or production exposures S3 and the one or more resulting devices measured to determine the effectiveness of the one or more process settings. In an embodiment, the process setting is applied locally, only to expose the relevant structure or part thereof. In other words, the process setting is applied during a part of the exposure that forms a latent image corresponding to at least a part of the structure and a different process setting is applied during other parts of the exposure. The results can be fed back to the empirical data S5 used to determine where improvements can be obtained.

The results of applying the one or more process settings determined according to an embodiment of the invention can also be used to determine S4 one or more useful modifications of the design of the device and/or to inform future designs.

A specific application of an embodiment of the invention is in edge placement error (EPE) control. One control option is to maximize the yield margin by minimizing EPE. Another option is to maximize or minimize the CD while staying within the process yield margin: this is a choice of optimization metrics. Another option is to improve CD matching between components that are physically separate in the device. Conventionally, in order to manufacture two components, e.g. transistors, with very similar characteristics it has been necessary to position those components close together in the device so that intra-field process variations do not affect the two components differently. The present invention can enable component matching, even when the components are relatively far apart in the device. This is very useful for some types of process, in particular semi-analog designs, which may be useful for artificial intelligence specific devices. Each of these optional maximization metrics leads to improved performance.

An embodiment of the invention advantageously applies performance-based optimization to local control: a specific region of a devices is exposed using a different control 'window'. For example, CDU or pattern placement control for a specific region is enabled by design-aware control offsets, per die region. These can be applied using known systems for adjusting the beam intensity across the width of a slit and during a scan or by other adjustments that affect imaging within a slit. Local control can also be applied by varying illumination/dose settings between exposure events, by varying optical aberrations by optical path deformation, or by other means known within the art.

Embodiments of the invention providing local control can enable user-selectable regions with increased bias or local pattern shift, at mm-scale and/or user selection for maximization of different variables (CD, CD matching, placement). In a logic circuit, local (intra-die) variations caused by a globally optimized lithography process can be compensated for to alleviate timing constraints.

As an example of the application of an embodiment of the invention to a specific design of a device, a specific register in a synchronous datapath may be "speed-limiting" for a design: the timing slack between clock and data arrival at that port is minimal and limits available device speedup. The arrival of electrical signals is governed by the device switching and wire capacitance and resistance encountered by the signals. Resistance and capacitance are influenced by contact/via sizing and wire proximity. Local speedup of a signal is therefore possible by adjusting one or more local contact critical dimensions upward (to reduce resistance) and one or more nearby parallel wire sizes downward (increasing the space between wires) thereby decreasing the wire capacitance. Adjustment of critical dimension or pattern placement may be done by the known lithographic method of within-slit width-variation, and/or by aberration selection, mirror deformation, or any like methods known to cause imaging variation.

Effective dimensional changes can be done by selectively altering the printed patterns on multiple layers to accelerate a constraining set of signals. This could increase the slack and relieve the timing constraint. The chip would then have "headroom" for increased operation frequency, which is desirable. Knowledge of the layout and datapaths from the device design would help improve the lithographic control performance, though conceptually, a study of natural or intentional in-process dimensional variations and non-parametric analysis of the chip speed versus the dimensions could also be performed.

Other examples of performance parameter that can be improved using an embodiment of the invention are setup and hold critical slacks in latches, which may be adjusted by a similar procedure to influence timing margins and/or frequency performance.

Another example is that taper and/or sizing of vias and/or line ends may be adjusted locally to move the electrical path geometry toward a truncated cone (conical frustum) possibly improving impedance matching, signal transmission, and/or timing margin.

Variations of dimensions in specific areas within a device may be targeted differently: for instance, the CPU area could have a differently selected inline CD bias relative to a neighboring cache area.

An embodiment of the invention can also be used to evolve design rules for a technology by (machine or manually) learning which dimensional or pattern variations affect the parametric yield, timing, and/or performance of synchronous or asynchronous systems.

An embodiment of the present invention can therefore provide higher effective yield through optimization of fabricated devices. Devices manufactured using an embodiment of the invention can have one or more critical dimensions and/or interlayer spacings locally modified to accommodate across-chip variations in the fabrication process. An embodiment of the invention would allow local variations to be controlled in a way that could ameliorate these variations and permit placement-aware design and performance optimization of (VLSI) circuits.

An example of application of the method of an embodiment of the invention to a semiconductor integrated circuit is now described with reference to FIG. 6. A target portion (die) C contains two copies of a particular circuit C1, C2. It is found that when manufactured using a globally optimized process a signal sent from driver 601 to receiver 602 arrives a short period, e.g. 20 ps, later than optimal. The trace from driver 601 to receiver 602 involves horizontal interconnects 603, 604 and a vertical interconnect 605. Through circuit simulation it is determined that the timing delay can be conveniently alleviated by adjustment of the width of vertical interconnect 605, specifically by increasing its width to reduce the resistance of the path from driver 601 to receiver 602.

For adjusting the width of vertical interconnect 605, a window 606 is designated around it. Window 606 is the smallest area over which the focus or dose of the exposure can be independently varied. In a modified process, the circuit C1 (but not circuit C2) is printed with a suitable amount of defocus in the window 606. As a result, vertical interconnect 605 is printed with a larger width than in the globally optimized process, resulting in a lower resistance between driver 601 and receiver 602. The timing problem is therefore solved or at least improved. It is noted that other vertical interconnects 607 that are within window 606 are also printed with greater width in the modified process than in the globally optimized process, while one or more other vertical interconnects 608 outside of the window 606 are largely unaffected. It is desirable to ensure, e.g. using simulation, that this increased width does not cause other problems.

In this example, the width of a vertical interconnect is increased to reduce the resistance of a path between two components. Of course a horizontal interconnect could also have its width increased to reduce resistance and in other circuits that might be more appropriate. There may be a choice of parts that can be adjusted to have a given effect. In an embodiment of the invention the adjustment that can be made most easily and that has least effect on other parts of the circuit is chosen. Once it has been determined that the width of a circuit element is to be increased, there may be choice of local adjustments to the lithographic process that can be made to have the desired effect. For example, and depending on the tone of the resist used, the width of a circuit element can be increased by increasing or introducing defocus or by increasing the exposure dose. Defocus can be a preferred parameter to adjust to increase width because, starting from a zero defocus, adding either a positive or negative defocus increases the width of the printed circuit element.

Figure 7A:
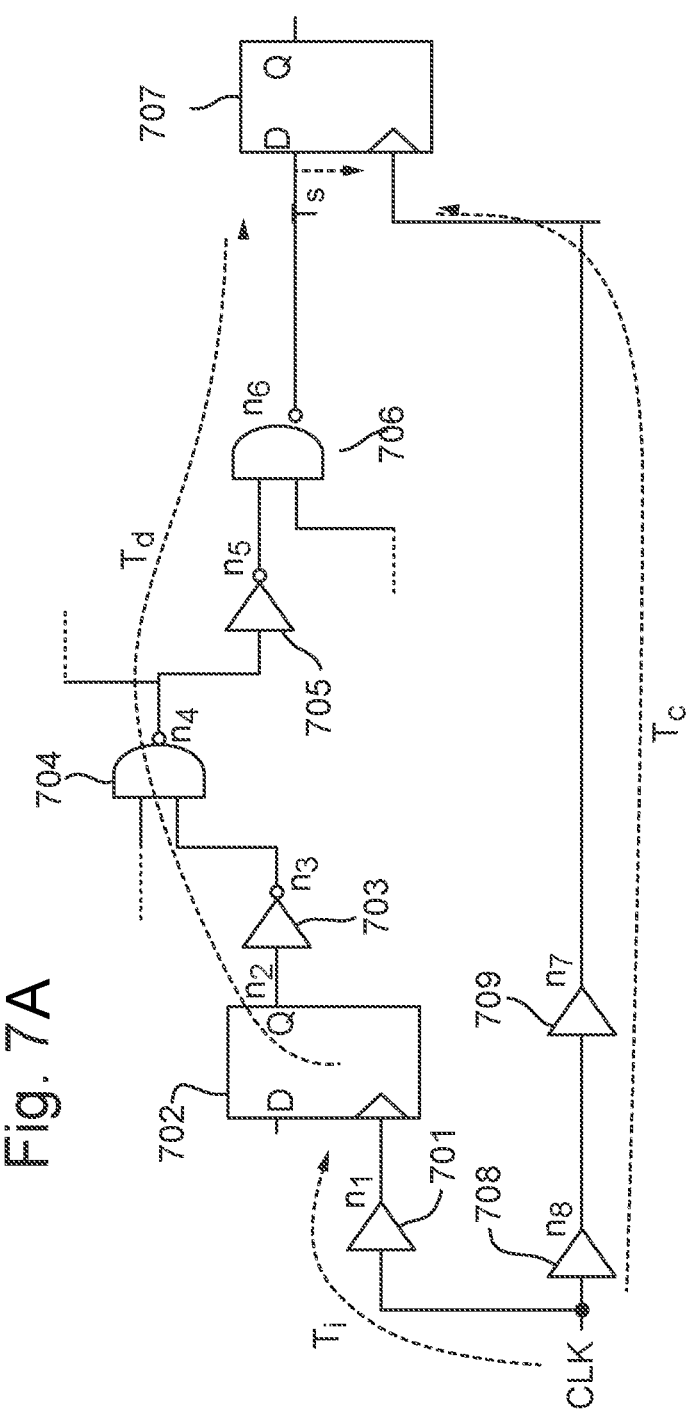
FIGS. 7A and 7B are a circuit diagram and timing diagram referred to in another worked example of the method of an embodiment of the invention.
Figure 7B:
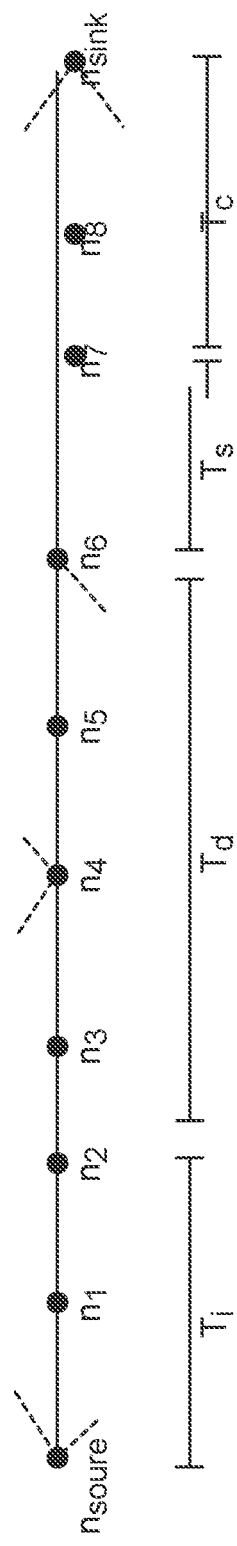

Another worked example will now be described with reference to FIGS. 7A, 7B, 8 and 9. FIG. 7A is a circuit diagram of a sequential circuit involving two D-flipflops 702, 707 and FIG. 7B is the associated timing graph. The circuit has two branches: a data path (upper branch in the figure) and a timing branch (lower branch in the figure). It is important that these two branches operate in synchronism for the correct functioning of the circuit. In addition to the D-flipflop 702, the data branch includes an input amplifier 701, inverter 703, NAND gate 704, inverter 705 and NAND gate 706. The timing branch has two amplifiers 708, 709.

Figure 9:
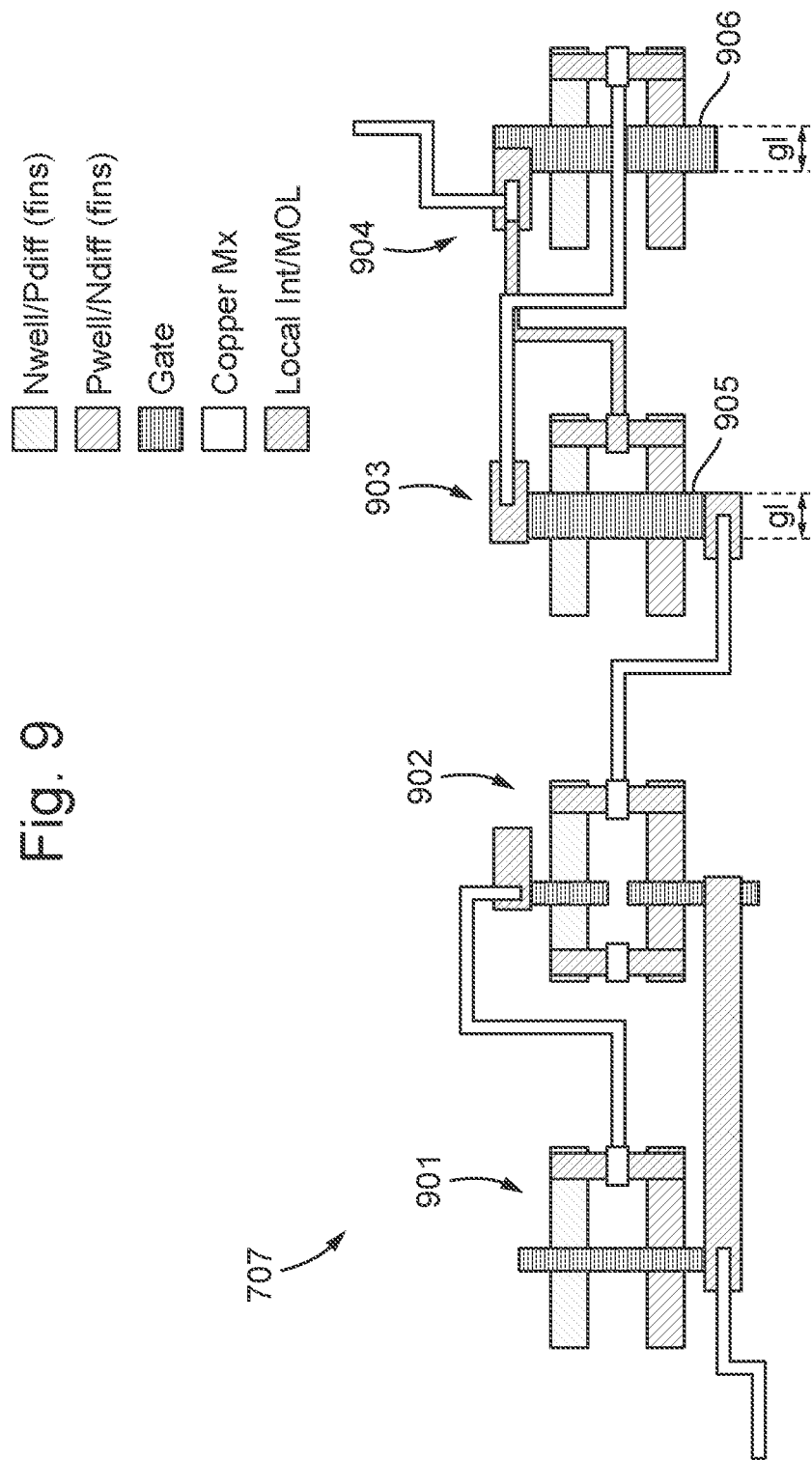
FIG. 9 is an exemplary chip layout of a D-flipflop indicating elements to be adjusted in an embodiment of the invention.

A chip layout for the circuit of FIG. 7A is shown in FIG. 8 and the chip layout for each of the D-flipflops 702, 707 is shown in FIG. 9. In FIGS. 8 and 9, rightward rising hatching represents n-type wells, leftward rising hatching represents p-type wells, horizontal hatching represents gates, white represents copper interconnect and crosshatching represents local interconnects.

A circuit such as that shown in FIG. 7A may occur many times in a device, at different locations within a target portion (die). When the device is printed using a globally optimized process, some instances of the circuit may exhibit sub-optimal timing. An embodiment of the present invention provides a means of locally adjusting different instances of the circuits to correct or improve their timing.

For example, the timing of the clock path can be adjusted by increasing or decreasing the critical dimension of the trace 801 between driver 709 and D-flipflop 707. Increasing the width of the line reduces its resistance and reduces the delay, and vice versa. Locally altering the width of the trace 801 can be done by locally altering the focus, dose or illumination source bandwidth.

As can be seen in FIG. 9, the D-flipflops 702, 707 include an input driver 901, 902 and cross-coupled inverters 903, 904. The cross-coupled inverters for a memory cell and the widths of gates 905, 906 determine the strength of the memory cell. A stronger memory cell holds its state longer but requires a larger charge to set. By local adjustment of the width of the gates 905, 906, the strength of the memory cell can be adjusted as required.

Figure 10:
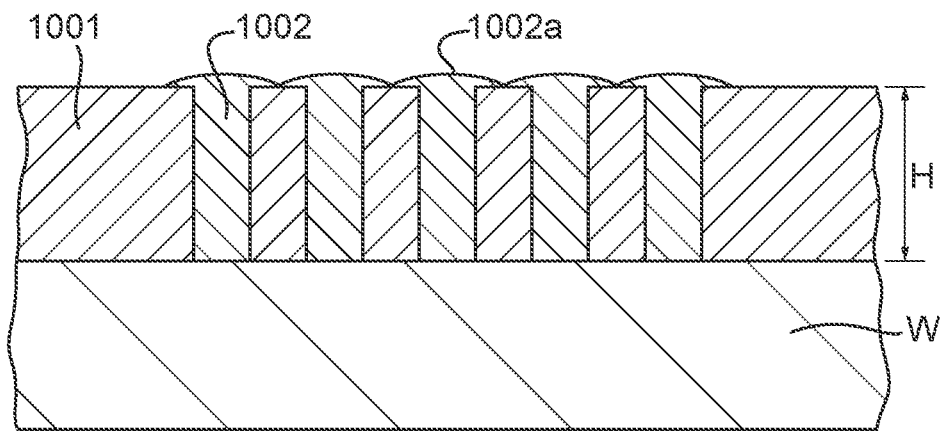
FIG. 10 is a diagram showing a step in a process for forming metallization layers.
Figure 11:
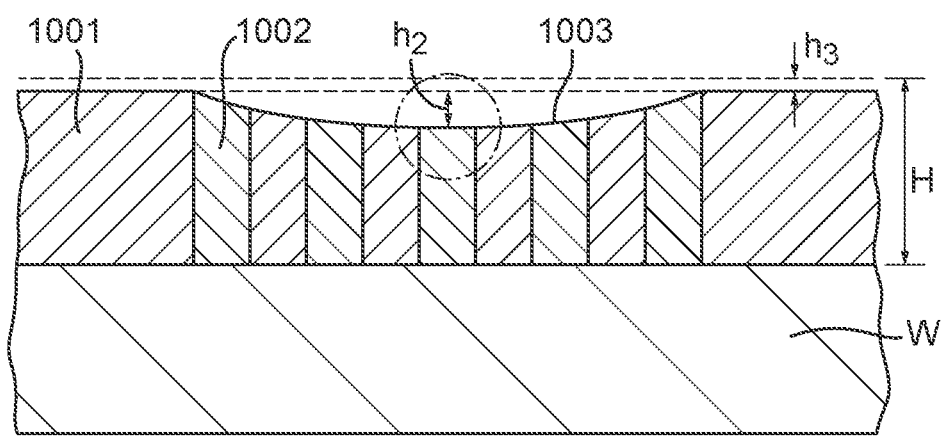
FIG. 11 is a diagram showing a subsequent step in a process for forming metallization layers.
Figure 12:
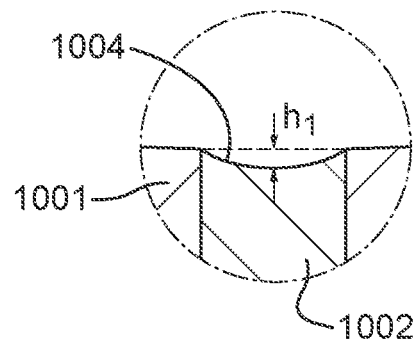
FIG. 12 is an enlargement of a part of FIG. 11.

A further embodiment of the invention is implemented in the formation of metallization layers using a damascene process and is illustrated in FIGS. 10 to 12. This embodiment applies to all conductive layers, e.g. using carbon or metal carbides as interconnect and the terms "metal" and "metallization" as used below are intended to encompass such equivalents. A semiconductor chip may have many layers of metallization formed after individual devices (such as transistors, capacitors, resistors, etc.) are formed in the substrate. The metallization layers that interconnect the individual devices are often referred to as Back End Of Line (BEOL).

In a damascene process, a dielectric layer 1001 is formed with an initial height H and trenches are formed by selective etching where metallic traces are to be formed. The trenches are then filled with metal 1002, e.g. Al. The trenches are over-filled to ensure complete filling, resulting in metal layers 1002a forming on the surface of the dielectric 1001 and potentially short-circuiting the metal traces. This is the situation shown in FIG. 10.

A chemical-mechanical polishing (CMP) step is therefore performed to remove the excess metal, as illustrated in FIG. 11. As a result of the CMP step, the height of the metallic traces 1002, 1003, 1004 is reduced from the initial, or design, height H due to three effects. Firstly, there is the dielectric loss $h_3$ which is necessary to ensure all short-circuits between metallic traces are removed. Secondly, in a region with multiple metallic traces close together there is additional erosion $h_2$. Thirdly, within each metal line there is a degree of dishing $h_1$, as shown in FIG. 12, which is an enlargement of part of FIG. 11. Thus, the final or actual line height h is given by:

$$h = H - h_3 - h_2 - h_1 \quad (1)$$

It is difficult to non-destructively measure the stack thickness of a patterned substrate in order to determine h directly. Therefore, to determine h, surface topography measurements are used to determine $h_1$ and $h_2$. This can be done by atomic force microscopy or in-line high resolution profilometry (HRP). The measured results for $h_1$ and $h_2$ can then be used to predict $h_3$ using various models. The relationships between $h_1$, $h_2$ and $h_3$ depend on factors such as the selectivity of the slurry used in the CMP step (i.e. the ratio of polishing speed of metal to the polishing speed of the dielectric) and the density of lines. The relationship between $h_1$ and $h_2$ is often linear. Not all patterns will experience both erosion and dishing. In some cases either or both of erosion $h_2$ and dishing $h_1$ can be negative, i.e. the filled material is left higher than the surrounding dielectric material. The relationships can be derived empirically ahead of time.

It will be seen that any variation in the initial height H or the amount of material removed in the CMP step results in a variation in the actual or final height of the metallic traces and hence their resistance. Both the initial dielectric height H and the amount of material removed can vary within and between fields. For example, spin-on dielectrics may vary in height between the center and periphery of the substrate and due to underlying patterns. As mentioned above, the amount of material removed in CMP can depend on local pattern densities. As discussed above, variations in the resistance of metallic traces can affect the performance of devices, e.g. by affecting the RC factor of a circuit or the leakage current of a memory cell.

In an embodiment of the invention, localized variations in the height of metallic traces are estimated or predicted. The resulting variation in resistance is calculated and changes to local CD necessary to compensate are determined. Local variations to one or more process parameters, e.g. focus and/or dose, can then be determined to achieve the desired local CD variations.

Estimation of localized variations in the height of the metallic traces can be determined by post-CMP inspection of test substrates as discussed above. Desirably, features in high density areas of the pattern are selected for inspection since such regions may have higher defect rates.

Further embodiments of the invention are disclosed in the numbered clauses below:

1. A method for controlling a processing apparatus used in a semiconductor manufacturing process to form a structure on a substrate, the method comprising:
   obtaining a relationship between a geometric parameter of the structure and a performance characteristic of a device including the structure; and
   determining a process setting for the processing apparatus at least partially based on an expected value of the geometric parameter of the structure when using the processing setting and a desired performance characteristic of the device.
2. A method according to clause 1, wherein the processing apparatus is a lithographic apparatus and the process setting is one or more selected from: focus, dose, optical aberration, pattern placement, pupil intensity distribution, and/or illumination source bandwidth.
3. A method according to clause 1 or 2, wherein determining a process setting is repeated for a plurality of different structures included in the device.
4. A method according to clause 1, 2 or 3, wherein determining a process setting is repeated for a plurality of different devices to be formed at different locations on the substrate.
5. A method according to clause 4, wherein determining a process setting is performed separately for devices formed in edge fields and for devices formed in inner fields.
6. A method according to any one of the preceding clauses, wherein the structure includes a via or a line end and determining a process setting comprises determining a process setting to make the shape of the via or line-end more conical.
7. A method according to any one of the preceding clauses, wherein the geometric parameter is one or more selected from: dimension, sidewall angle, position, orientation, line edge roughness, and/or edge placement error.
8. A method according to any one of the preceding clauses, wherein the performance characteristic is an electrical and/or thermal performance characteristic.
9. A method according to clause 8, wherein the performance characteristic is one or more selected from: electrical resistance of part of the structure, capacitance of part of the structure, inductance of part of the structure, and/or thermal conductivity of part of the structure.
10. A method according to clause 8, wherein the performance characteristic is a timing characteristic of a functional unit of the device.
11. A method according to claim 1, wherein the geometric parameter is height of a conductive feature, the performance characteristic is resistance of the conductive feature, and the process setting is focus and/or dose.
12. A device manufacturing method comprising:
exposing a radiation-sensitive layer on a substrate to form a latent image therein;
developing the radiation-sensitive layer to fix the latent image; and
transferring the fixed image onto the substrate;
wherein at least one selected from the exposing, developing and/or transferring steps is performed using a process setting determined by a method according to any one of clauses 1 to 11.
13. A method according to clause 12, wherein the process setting is applied during a part of the exposing that forms a latent image corresponding to at least a part of the structure and a different process setting is applied during one or more other parts of the exposing.

Although specific reference may be made in this text to the use of metrology apparatus in the manufacture of ICs, it should be understood that the apparatus described herein may have other applications. Possible other applications include the manufacture of integrated optical systems, guidance and detection patterns for magnetic domain memories, flat-panel displays, liquid-crystal displays (LCDs), thin film magnetic heads, etc.

Although specific reference is made in this text to "metrology apparatus" or "inspection apparatus", both terms may also refer to an inspection apparatus or an inspection system. For example, the inspection or metrology apparatus that comprises an embodiment of the invention may be used to determine characteristics of structures on a substrate (e.g., a wafer). For example, the inspection apparatus or metrology apparatus may be used to detect defects of a substrate or defects of structures on a substrate (e.g., a wafer). In such an embodiment, a characteristic of interest of the structure on the substrate may relate to defects in the structure, the absence of a specific part of the structure, or the presence of an unwanted structure on the substrate (e.g. the wafer).

Although specific reference may be made in this text to embodiments of the invention in the context of a metrology apparatus, embodiments of the invention may be used in another apparatus. Embodiments of the invention may form part of a patterning device (e.g., mask) inspection apparatus, a lithographic apparatus, or any apparatus that measures or processes an object such as a wafer (or other substrate) or mask (or other patterning device). These apparatuses may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that an embodiment of the invention, where the context allows, is not limited to optical lithography and may be used in other applications, for example imprint lithography.

While specific embodiments of the invention have been described above, it will be appreciated that embodiment of the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A method for controlling a processing apparatus used in a semiconductor manufacturing process to form a structure on a substrate, the method comprising:
obtaining a relationship between a geometric parameter of the structure and a performance characteristic of a device including the structure; and
determining, by a hardware computer system, a process setting for the processing apparatus associated with a location on the substrate, wherein the process setting is at least partially based on the relationship, an expected value of the geometric parameter of the structure when using the processing setting, and a desired performance characteristic of the device.
2. The method according to claim 1, wherein the processing apparatus is a lithographic apparatus and the process setting is one or more selected from: focus, dose, optical aberration, pattern placement, pupil intensity distribution, and/or illumination source bandwidth.
3. The method according to claim 1, wherein the determining a process setting is repeated for a plurality of different structures included in the device.
4. The method according to claim 3, wherein the process setting is configured to enable matching of structures within the device.
5. The method according to claim 4, wherein the structures are relatively far apart.
6. The method according to claim 4, wherein the matching is targeted to match a critical dimension (CD) of the structures.
7. The method according to claim 1, wherein the determining a process setting is repeated for a plurality of different devices to be formed at different locations on the substrate.
8. The method according to claim 7, wherein the determining a process setting is performed separately for devices formed in edge fields of the substrate and for devices formed in inner fields of the substrate.
9. The method according to claim 1, wherein the structure includes a via or a line end and the determining a process setting comprises determining a process setting to make the shape of the via or line-end more conical.
10. The method according to claim 1, wherein the geometric parameter is one or more selected from: dimension, sidewall angle, position, orientation, line edge roughness, and/or edge placement error.
11. The method according to claim 1, wherein the performance characteristic is an electrical and/or thermal performance characteristic.
12. The method according to claim 11, wherein the performance characteristic is one or more selected from:

electrical resistance of part of the structure, capacitance of part of the structure, inductance of part of the structure, and/or thermal conductivity of part of the structure.

13. The method according to claim 1, wherein the performance characteristic is a timing characteristic of a functional unit of the device.

14. A device manufacturing method comprising:
exposing a radiation-sensitive layer on a substrate to form a latent image therein;
developing the radiation-sensitive layer to fix the latent image; and
transferring the fixed image onto the substrate;
wherein at least one selected from: the exposing, the developing and/or the transferring is performed using a process setting determined by the method according to claim 1.

15. The method according to claim 14, wherein the process setting is applied during a part of the exposing that forms a latent image corresponding to at least a part of the structure and a different process setting is applied during other parts of the exposing.

16. A non-transitory computer-readable medium comprising computer instructions therein, the instructions, upon execution by a computer system, configured to cause the computer system to at least:
obtain a relationship between a geometric parameter of a structure and a performance characteristic of a device including the structure, wherein a processing apparatus used in a semiconductor manufacturing process is used to form the structure on a substrate; and
determining, by a hardware computer system, a process setting for the processing apparatus associated with a location on the substrate, wherein the process setting is at least partially based on the relationship, an expected value of the geometric parameter of the structure when using the processing setting, and a desired performance characteristic of the device.

17. The computer-readable medium according to claim 16, wherein the processing apparatus is a lithographic apparatus and the process setting is one or more selected from: focus, dose, optical aberration, pattern placement, pupil intensity distribution, and/or illumination source bandwidth.

18. The computer-readable medium according to claim 16, wherein the determination of a process setting is repeated for a plurality of different structures included in the device.

19. The computer-readable medium according to claim 16, wherein the performance characteristic is an electrical and/or thermal performance characteristic.

20. The computer-readable medium according to claim 16, wherein the geometric parameter is one or more selected from: dimension, sidewall angle, position, orientation, line edge roughness, and/or edge placement error.

21. The computer-readable medium according to claim 16, wherein instructions configured to cause the computer system to determine a processing setting are further configured to cause the computer system to determine the process setting at least partly based on an expected manufacturing margin associated with the location on the substrate that will at least maintain yield.

* * * * *